D. H. PEARCE & A. W. TAFT.

Assignor of one-half interest to S. W. BENNETT & A. G. PIERCE.

Center Rim for Watch-Cases.

No. 8,396. Reissued Sept. 3, 1878.

WITNESSES:

Joseph A. Miller Jr.

William L. Coop.

INVENTOR:

David H. Pearce

Alanson W. Taft by Joseph A. Miller

Attorney

N. PETERS, PHOTO-LITHOGRAPHER, WASHINGTON, D. C.

UNITED STATES PATENT OFFICE.

DAVID H. PEARCE AND ALANSON W. TAFT, OF PROVIDENCE, RHODE ISLAND, ASSIGNORS OF ONE-HALF INTEREST TO SAMUEL W. BENNETT AND ALFRED G. PIERCE.

IMPROVEMENT IN CENTER RIMS FOR WATCH-CASES.

Specification forming part of Letters Patent No. 202,458, dated April 16, 1878; Reissue No. 8,396, dated September 3, 1878; application filed August 5, 1878.

*To all whom it may concern:*

Be it known that we, DAVID H. PEARCE and ALANSON W. TAFT, both of the city and county of Providence, and State of Rhode Island, have invented new and useful Improvements in Center Rims for Watch-Cases; and we hereby declare that the following is a full, clear, and exact description of the same, reference being had to the accompanying drawings, forming part of this specification.

This invention has reference to the construction of the part of a watch-case known in the art as the "center rim," or that portion to which the two covers are secured.

The object of the invention is to construct the center rim of plate metal, rolled or drawn so as to contain all the configurations of outline required in the finished article, and so as to produce the center rim of stock-plate without subsequent turning, rolling, or cutting, which may have its different surfaces made of plate presenting different qualities of fineness of metal.

The invention consists in the novel construction of the center rim, by which the two side bands are made in one piece of sheet metal, secured within the center bead, and both the side bands and the center bead made of rolled or drawn stock, having all the configurations and sectional profile of the desired finished article, all of which will be more fully set forth hereinafter, and pointed out in the claims.

Figure 1:
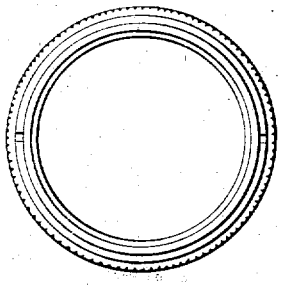
Figure 2:
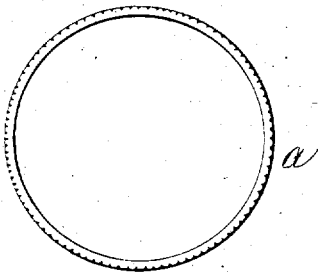
Figure 3:
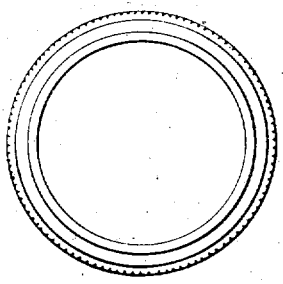
Figure 4:
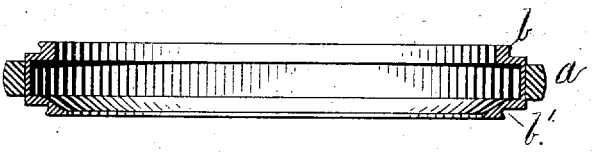

Figure 1 represents the center rim; Fig. 2, the center bead; Fig. 3, the center rim complete on the side opposite to the side shown in Fig. 1. Fig. 4 is an enlarged sectional view of the center rim, showing the center bead and the side bands.

The center rim for watch-cases is that central portion to which the works of the watch, the bezel to hold the watch-glass, and the inner and the outer cover are secured; and consists of the center bead *a* and the two side bands *b* and *b'*.

Center rims have heretofore been made, first, of one solid piece of metal, turned in a lathe; and if the center band was to be ornamented, such was done by the application of a revolving steel die pressed against the band while the latter, held upon a mandrel, revolved in a lathe.

In the present state of the art, it is desirable to make all parts of a watch-case of stock-plate, and the parts exposed to view of finer quality than the parts less exposed; and when stock-plate in which an inferior metal covered by a finer metal of the same quality on both sides, or with two qualities of finer metal, the finer for the outside and the inferior for the inside, is to be used, such sheet metal cannot be turned and shaped after it is united in a ring, as such turning would cut through the fine plating and expose the inferior metal. We therefore draw or roll the two side bands and the center bead, with the snapping edges and all the configurations or ornamentations, out of such stock-plate, and do not cut any portion of the plating, thus producing a center rim of stock-plate which is as durable as a solid rim, presents as fine a metal on its surface, and can be made and sold much cheaper.

Center rims for watch-cases have also been made in two halves, each half consisting of one side band and half of the center bead, by striking up from sheet metal by means of suitable dies. These two halves were then soldered together. The objection to this method of making the center rims is, first, that stock-plate, in which an inferior metal is plated with fine metal, cannot be used, as the outer or snapping edges of the side bands, being slightly larger in diameter than their inner part, cannot be produced in dies, and have to be made by undercutting the bands in a lathe, and thus cutting away the finer or precious metal and exposing the inferior inner metal. The second objection is, that the joint to be soldered comes in the center of the center bead, and in the most conspicuous part of the watch-case, and when the bead is to be ornamented it will stretch under the pressure of the revolving dies and wring the side bands out of shape.

A third mode of constructing center rims for watch-cases consists in making the center bead of a strip of metal formed into circular shape, milled, and turned off in a lathe, when two separate side bands, also shaped in dies and turned in a lathe, so as to produce the undercut snapping edges, are each secured separately to the center bead by soldering the same.

It must be apparent that in these center rims, as heretofore constructed, stock-plate, in which an inferior metal is covered by fine or precious metal and rolled into sheets, cannot be used, as all have to be finished and turned by cutting-tools, which will expose the interior metal, and that such center rims require replating.

Stock-plate can be drawn or rolled into any desired shape without injuring the covering precious metal, and when so drawn or rolled any desired shape, configuration, or section may be produced with the snapping edges on the side bands and the milling or other ornamentation on the center bead without cutting or injuring the thin plating of precious metal; and stock-plate having a plating of the finest quality of gold on one side and an inferior quality on the other may be rolled or drawn into any desired shape without exposing the base or inferior metal.

In our improved center rims the side bands are formed, between suitable rollers, out of strips of stock-plate by rolling or drawing, so as to conform to the section required; and as the central portion uniting the two side bands can be reduced more in thickness than the rest, the metal forms a spiral, from which the rings are cut, the ends soldered together, and the whole finished in suitable dies. The center bead can be drawn of any desired section, and any desired ornamentation can be produced in rolling the same by suitable rolls, when the center bead is forced over the side bands and firmly secured, making a stronger, better, and cheaper center rim than when the two side bands are separately made and secured to the center bead, with less labor, and without replating the same or injuring the finer surface of the stock-plate.

A center rim in which the two side bands are made in one piece forms a superior article of manufacture. The two side bands, when in one piece, can be more readily secured and more firmly held than when two side bands are secured to the center bead, one on each side of the center bead, as has been done heretofore, and which requires great care in properly securing the side bands to the center rim, so as to properly receive the covers and insure a tight fit. The side bands may be secured to the center bead by soldering in the usual manner. They may be rolled or expanded within the center bead. The center bead may be forced over the side bands sufficiently tight to firmly secure the same; or they may be secured in any other manner by which they are firmly retained. By thus rolling or drawing both the center rim and the side bands, with all their outlines and configurations complete, and then shaping the same into a true ring and securing the ends, the center rim is completed, and the bead can be soldered, and does not require recutting and resoldering, as is the case when the bead is finished after it is soldered, and, as it stretches in milling, cut open and reformed and resoldered.

Having thus described our invention, we claim as new and desire to secure by Letters Patent—

1. The method herein described for constructing the center rim for watch-cases, consisting in rolling or drawing the two side bands in one piece of plate, the center bead in a separate piece of plate, forming the side bands and the center bead into rings, and securing the ring forming the two side bands within the ring forming the center bead.

2. A center rim for watch-cases in which the two side bands are drawn or rolled in one piece and secured within the center bead, substantially as described, as a new article of manufacture.

3. The two side bands of a center rim for watch-cases, when made in one piece separate from the center bead, and arranged to fit within the center bead, substantially as and for the purpose set forth.

4. In a center rim for watch-cases, the combination, with the two side bands, *b* and *b'*, made in one piece of drawn or rolled metal, of the center bead *a*, substantially as and for the purpose set forth.

5. A center rim for watch-cases consisting of two rings, the outer forming the center bead and the inner both of the side bands.

DAVID H. PEARCE.
ALANSON W. TAFT.

Witnesses:
JOSEPH A. MILLER,
S. E. CARPENTER.